(12) United States Patent
Terrien et al.

(10) Patent No.: US 7,160,473 B2
(45) Date of Patent: *Jan. 9, 2007

(54) MANUALLY CONTROLLED SKIMMING OF INDUSTRIAL OIL CONTAMINANTS

(75) Inventors: Richard J. Terrien, Madison, WI (US); David T. Walker, Streator, IL (US)

(73) Assignee: Universal Separators, Inc., Madison, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 10/934,677

(22) Filed: Sep. 3, 2004

(65) Prior Publication Data

US 2005/0029203 A1 Feb. 10, 2005

Related U.S. Application Data

(63) Continuation of application No. 09/812,765, filed on Mar. 20, 2001, now Pat. No. 6,790,370.

(51) Int. Cl.
*C02F 1/40* (2006.01)
*E02B 15/10* (2006.01)

(52) U.S. Cl. .............. 210/776; 210/238; 210/242.3; 210/406; 210/416.1; 210/470; 210/923

(58) Field of Classification Search ........... 210/776, 210/799, 800, 804, 805, 167, 168, 171, 172, 210/238, 241, 242.1, 242.3, 470, 513, 923
See application file for complete search history.

(56) References Cited

U.S. PATENT DOCUMENTS 5,456,829 A  10/1995  Brown ................. 210/194
5,948,266 A  9/1999  Gore et al. ............. 210/693
5,948,274 A  9/1999  Lyon et al. ............. 210/760
6,790,370 B1 *  9/2004  Terrien et al. .......... 210/776
6,827,853 B1 * 12/2004  Terrien et al. .......... 210/238
2002/0134739 A1 *  9/2002  Terrien et al. .......... 210/776
2004/0104155 A1 *  6/2004  Terrien et al. .......... 210/188
2005/0029203 A1 *  2/2005  Terrien et al. .......... 210/776
2005/0236311 A1 * 10/2005  Terrien et al. .......... 210/188

OTHER PUBLICATIONS

YK-50HS Hand Skimmer (For Emergency Purposes), http://www.worldchemusa.com/ocprod11.htm (Jan. 29, 2001).
Drumit, The drum filling vacuum head with auto shut off, *Elastec American Marine*, http://www.elastec.com.drimit.html (Jan. 26, 2001).

* cited by examiner

*Primary Examiner*—Robert James Popovics
(74) *Attorney, Agent, or Firm*—Medlen & Carroll, LLP

(57) ABSTRACT

The present invention provides a method for removing an oil contaminant from the surface of an aqueous solution, comprising manually controlling a surface skimmer from a remote location to remove a layer or a batch of an oil contaminant from an oil-aqueous solution mixture by the skimmer, where the aqueous solution is contaminated by the oil as a result of an industrial process. The present invention also provides a system for carrying out the method, which comprises a surface skimmer, a collection means which is preferably a separator, a conduit connecting the skimmer to the collection means in an airtight fashion, and means for creating negative pressure in the skimmer, where the skimmer is capable of manual control from a remote location.

6 Claims, 2 Drawing Sheets

MANUALLY CONTROLLED SKIMMING OF INDUSTRIAL OIL CONTAMINANTS

This application is a continuation application of U.S. patent application Ser. No. 09/812,765, filed Mar. 20, 2001, which issued as U.S. Pat. No. 6,790,370 on Sep. 14, 2004.

FIELD OF THE INVENTION

The present invention relates to removal and treatment of a surface layer of liquid which floats atop another liquid, and in particular to the removal and treatment of a surface layer of an oil or oil-like substance from a contained body of an aqueous solution.

BACKGROUND OF THE INVENTION

Oil-water mixtures are generated as a result of various activities, and a major source of such mixtures is industrial activity. For a number of reasons, it is desirable to separate the oil from such mixtures. Environmentally, it is desirable to limit the amount of pollution resulting from the discharge of such mixtures resulting from the sites of such industrial activity; it is preferable to recycle and reuse the oil and water components of the mixtures. Economically, it is often desirable to continue to utilize a solution in which an oil becomes a contaminant, as such solutions typically contain a number of additives which are expensive. It is also desirable to remove an oil contaminant so that a particular industrial process may proceed under conditions which are as clean and uncontaminated as possible, thus improving both the manufacturing process and workplace health and safety.

For example, many machine parts or heat treated parts are washed in parts washing tanks, resulting in the washing solution becoming contaminated with manufacturing oils and heat treating quench oils. Although in the past, this contaminated wash water was discharged into the sewage system, it became necessary to haul the oil-contaminated wash water away to disposal sites or to treatment sites for further separation. Oily contamination in the parts washing solutions contributes to an inefficient cleaning process which typically requires secondary cleaning and manufacturing steps to correct, which then result in added time and expense. The contaminating oil in parts washers is often carried into subsequent heat treating tempering furnaces where the oil burns off as smoke in the plant which is then discharged into the local environment. Moreover, the presence of the oily contaminant also endangers the health and safety of the plant workers. Not only is the in-plant smoke a danger, but frequent changes of washing baths due to oil contamination require increased worker exposure to cleaning fluids and related handling hazards.

Several types of treatment methods and systems have been developed in efforts to efficiently separate oil from oil-water mixtures. Typically, these involve a means to remove a fraction of the mixture which is enriched in oil, and a means to further separate the oil from this fraction. The removal means are typically skimmers, which skim a fraction enriched in the oil from an oil-water mixture. Many different types of skimmers are known; these include belt skimmers, disk skimmers, drum/barrel skimmers, mop skimmers, tube skimmers, and floating suction skimmers. The separation means vary, and include from one to several of the following: filtration separation, gravity separation, including vertical and horizontal separators, and coalescing separators, which include tightly packed beds of plates, helical coalescers, and gas bubbles.

These treatment systems are utilized in a variety of situations, which range from open water to boat marinas to tanks in industrial plants. Although they vary in their details, they share several features in common: they are designed to be used for large volumes of oil-water mixtures with large surface areas, and to be used continuously. Thus, these systems are generally large, heavy, and relatively immobile as they are fixed in place, and then operated continuously.

However, there are many situation in which such large, immobile systems are less than ideal. Such situations include multiple small volumes of mixtures, each in small tanks, and tanks with obstacles protruding from the surface. Such obstacles include mechanical apparatus supporting the tank's purpose, including sprann and immersion hardware. In these situations, it would be desirable to collect and treat accumulated oil in the surface layer in batches, rather than continuously. It would also be desirable to have an oil-water mixture treatment system which is mobile, for use with multiple mixtures, as would exist in multiple tanks. It would also be desirable to have a collection means which is manually controlled, for maneuverability across a surface and around surface protruding obstacles in the oil-water mixture.

SUMMARY OF THE INVENTION

It is an object of the present invention to provide a method of collecting an oil contaminant from the surface of a solution where the solution is contaminated as a result of an industrial activity, and where the method is easily and advantageously used in the industrial setting and can be employed for multiple tanks and in a batch mode. It is a further object to provide a system for collecting and treating such an oil contaminant from the surface of a solution, where the system is lightweight and mobile, and can be easily deployed among multiple tanks of different configurations and locations.

These and other objects are met by the present invention. In some aspects, the present invention provides a method for removing a layer of an oil contaminant from the surface of an aqueous solution, comprising providing a solution contaminated by oil as a result of an industrial activity, and a surface skimmer which can be manually controlled from a remote location; and manually controlling the surface skimmer to remove a layer of oil by the skimmer. In other aspects, the present invention provides a method for removing a batch of an oil contaminant from the surface of an aqueous solution, comprising providing a solution contaminated by oil as a result of a manufacturing process, and a surface skimmer which can be manually controlled from a remote location, and manually controlling the surface skimmer to remove a layer of oil by the skimmer for a sufficient time to remove a batch of oil.

In certain embodiments of both aspects, the industrial activity is selected from the group consisting of parts cleaning and washing, cutting and grinding, die casting, metal plating, heat treating, surface finishing, pressure washing, steam cleaning, cooling, lubricating, cleaning, and food processing. In other embodiments of both aspects, the solution is enclosed in a tank at a location of the industrial activity. In yet other embodiments of both aspects, the oil comprises hydraulic oils, surface finishing oils, quench oils, way oils, cutting, grinding and hobbing oils, and oils derived from food sources. In yet other embodiments, the method further comprises separating the aqueous solution from the oil contaminant removed from the solution surface. In a preferred embodiment of both aspects, the method further comprising separating the aqueous solution from the oil contaminant removed from the solution surface, wherein the industrial activity is selected from the group consisting of parts cleaning and washing, cutting and grinding, die casting, metal plating, heat treating, surface finishing, pressure washing, steam cleaning, cooling, lubricating, cleaning, and food processing, wherein the solution is enclosed in a tank at a location of the industrial activity, wherein the oil comprises hydraulic oils, surface finishing oils, quench oils, way oils, cutting, grinding and hobbing oils, and oils derived from food sources.

The present invention also provides a system for removing a layer of an oil contaminant from the surface of an aqueous solution, comprising a surface skimmer, a collection means, a conduit connecting the skimmer to the collection means in an airtight fashion, and means for creating negative pressure in the skimmer, where the skimmer capable of manual control from a remote location, and where the solution is contaminated as a result of an industrial process. In one aspect of the present invention, the system can be used to remove a surface layer of an oil contaminant; in another aspect, the system is used to remove a batch of a surface layer of an oil contaminant. In one embodiment of both aspects, the skimmer is lightweight and portable. In another embodiment of both aspects, the collection means is lightweight and mobile. In yet another embodiment of both aspects, the collection means is a vertical separator. In a preferred embodiment of both aspects, the skimmer is lightweight and portable, and \ the collection means is lightweight and mobile and a vertical separator.

The present invention also provides a device for removing a layer of an oil contaminant from the surface of an aqueous solution, comprising a surface skimmer, a collection means, a conduit connecting the skimmer to the collection means in an airtight fashion, and means for creating negative pressure in the skimmer, wherein the skimmer capable of manual control from a remote location and comprises a hollow tube with two ends and two openings. The first opening is a skimmer inlet, such that the inlet is an opening cut horizontally along the tube, and close to a first end which is closed, and the second opening is a skimmer outlet, and is a second end which is open and which can be connected to the conduit.

The present invention also provides a device for removing a layer of an oil contaminant from the surface of solution, comprising a surface skimmer, a collection means, a conduit connecting the skimmer to the collection means in an airtight fashion, and means for creating negative pressure in the skimmer, where the skimmer capable of manual control from a remote location. The skimmer comprises a hollow tube with two ends and two openings, where the first end of the tube is partially closed and comprises an inlet, and where the inlet extends along the tube from the partially closed first end. The second end of the tube is open and comprises an outlet. The tube is also angled between the first and the second end. In a preferred embodiment, the tube is angled at a right angle. In another preferred embodiment, the skimmer further comprises a handle by which the skimmer can be remotely controlled.

DESCRIPTION OF THE FIGURES

FIG. 1 shows a simple tubular skimmer.

FIG. 2 shows an angular surface skimmer.

GENERAL DESCRIPTION OF THE INVENTION

Figures 1A, 1B:
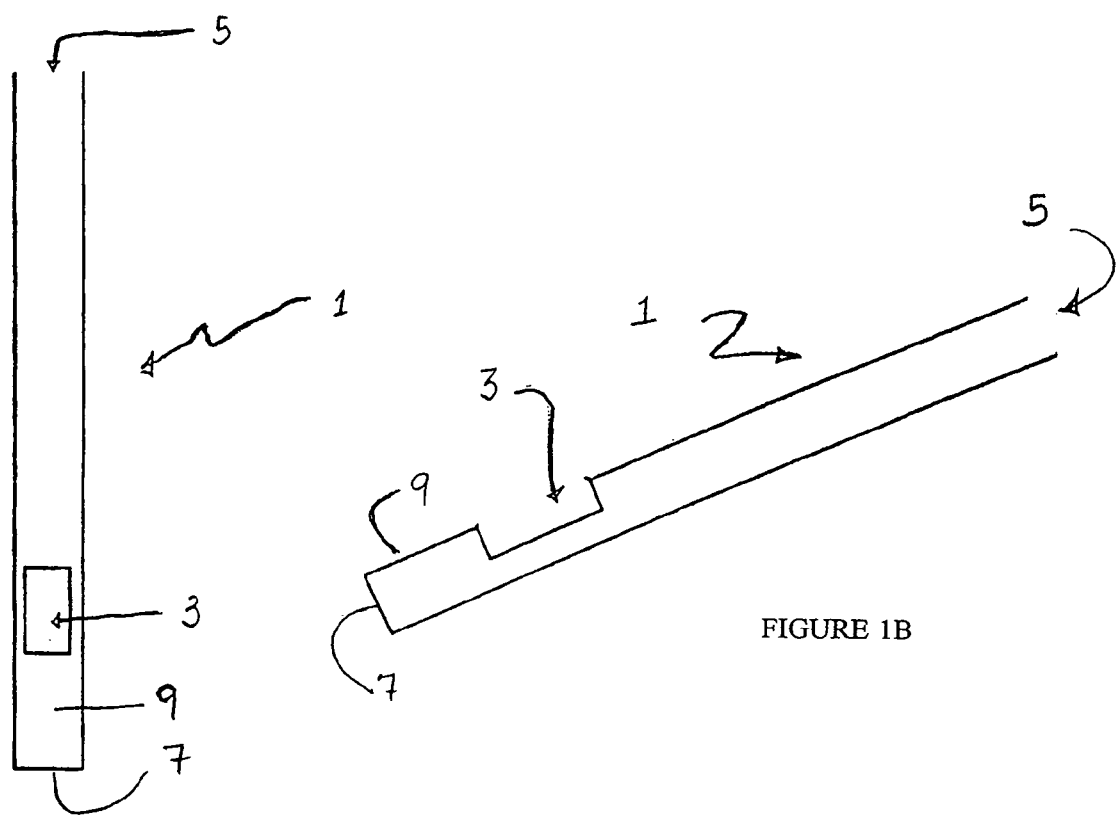
FIG. 1A shows a surface view.
FIG. 1B shows a side view.

The present invention relates to removal and treatment of a surface layer of liquid which floats atop another liquid, and in particular to the removal and treatment of a surface layer of an oil or oil-like substance from a contained body of an aqueous solution.

In one aspect, the invention provides a method for removing a layer of an oil contaminant from the surface of an aqueous solution, comprising manually controlling a surface skimmer from a remote location to remove a layer of oil from an oil-solution mixture by the skimmer, where the aqueous solution is contaminated by the oil as a result of an industrial process.

In an alternative aspect, the invention provides a method for removing a batch of an oil contaminant from the surface of an aqueous solution, comprising manually controlling a surface skimmer from a remote location for a sufficient time to remove a batch of oil from an oil-solution mixture by the skimmer, where the aqueous solution is contaminated by the oil as a result of an industrial process.

The present invention also relates to a system for carrying out the methods described above; the system comprises a surface skimmer, a collection means which is preferably a separator, a conduit connecting the skimmer to the collection means, and means for creating negative pressure in the skimmer, where the skimmer is lightweight and portable and capable of manual control from a remote location, and where the collection means is lightweight and mobile.

The present invention also relates to a device for carrying out the methods described above; the device comprises a surface skimmer which is a part of the system which further comprises a collection means which is preferably a separator, a conduit connecting the skimmer to the collection means, and means for creating negative pressure in the skimmer, where the skimmer is lightweight and portable and capable of manual control from a remote location, and where the collection means is lightweight and mobile. In one aspect, the surface skimmer comprises a hollow tubular skimmer with an inlet comprising a weir. In another aspect, the skimmer comprises an angled tubular skimmer with an inlet comprising a weir. In alternative embodiments, the skimmer is further buoyantly supported on the solution surface by floats which are integral to or attached to the skimmer.

Many industrial activities result in the contamination of an aqueous solution by an oil. These activities include the use of aqueous solutions for metal parts cleaning in the metal working industry, cutting and grinding oils, die casting, metal plating, pressure washers, and steam cleaning. Other examples include the field of painting, and particularly in spray booth applications. Yet another includes the field of printing, and the use of aqueous solutions to clean printing equipment. Thus, the term "industrial activities" encompasses manufacturing methods, processes, and operations.

Solutions contaminated by oil or oil-like compounds include those contained within circulating aqueous fluid systems present in most manufacturing or processing facilities. These fluids are typically used for cleaning and cooling of machines and materials being manufactured. The fluids collect in a central tank or sump, and is referred to waste water sumps.

Other examples of solutions contaminated by oil or oil-like compounds are coolants and cutting fluids. Machine coolants are typically an aqueous-based mixture which may contain emulsified oils or oil-like compounds as work is performed. The coolant, which washes metal cuttings off the part and carries heat from the tooling, is collected in a reservoir so that the coolant can be recycled to the machine tooling as needed. In many situations, the machined part has a coating of oil on it which is carried away with the coolant. This contaminating oil washed off the part by the coolant is called "tramp oil;" tramp oils are derived from mill oil, lubricant, or hydraulic fluid. The presence of tramp oils in the coolant precipitates a chain of reactions that can quickly render the coolant unsuitable for further use.

Coolant mixtures are exquisitely blended to result in very thin and perfectly slippery films of solution on metal surfaces with extremely close tolerances. When machine coolants become contaminated with tramp oils, the result is a reduction in coolant life, a reduction in the quality of machined parts, and a hazard to human health. Tramp oils are immiscible in the coolant solutions, and tend to coalesce into large globs and collect upon the surface of the solution. The presence of tramp oils disrupts the very thin and slippery films, thus decreasing the efficiency of cooling, and can in fact result in tool breakage, leading to expensive downtime and repairs. The tramp oils can also go rancid, as they attract biological contaminants; the biological materials can in turn form mat like structures, which can clog up the machinery and exacerbate the problems caused by the tramp oils alone. Moreover, the pH of the coolant can change as a result of the presence of the biological materials; for example, the pH begins to decrease as bacterial colony counts increase. As the coolant becomes more acidic, additional problems arise. Machine coolant that becomes acidic from bacterial growth tends to dissolve metallic ions from the parts machined. This allows toxic heavy metals to leach into and collect in the coolant, for example, chromium, cadmium, lead, and nickel, which affect tool life and parts finish. The tramp oils also represent a human health hazard, from the oils alone, which can result in the appearance of smoke in the shop, causing irritation and other health-related problems to the workers, from the presence of the biological contaminants, which are a further source of health hazards and irritants, and from the presence of the heavy metals, which are another health hazard. Typically, the presence of tramp oils required that the coolant solution be discarded, often after a limited number of hours. However, because the coolant is considered hazardous waste, it is very expensive to handle and discard.

Yet other examples of solutions contaminated by oil or oil-like compounds are solutions resulting from heat treating. Typical heat treatment includes heating to some austenitizing temperature, then quenching in an oil bath to harden the steel. After quenching, the parts are washed and tempered to reduce residual stresses. Quench oils that must be removed from heat treated parts can be captured for re-use or disposal. The results are lower quench oil costs, prolonged wash water life and lower disposal costs. Yet other examples are solutions used in parts washers. Floating oils re-contaminate parts as they are removed from a wash tank. Removal of the oil results in oil-free parts and extended fluid life.

Yet other examples are solutions used in food processing facilities. Vegetable oils, greases and animal fats enter into a plant's wastewater; the removal of these contaminants reduces the costs of processing and disposal of the wastes.

These industrial processes result in the contamination of an aqueous solution by an oil or oil-like contaminant. By "an aqueous solution" or "solution" it is meant a solution, of which water is the solvent. The solution may comprise water alone, or various additives in addition to water. For example, a coolant is an aqueous solution. By "oil" it is meant a contaminant of an aqueous solution which is substantially immiscible with water, and which has a specific gravity less than that of water. Oils are generally viscous, combustible liquids that are soluble in certain organic solvents, such as ether and naphtha, and they may be of animal, plant, mineral, or synthetic origin. Thus, the term encompasses "oil-like" compounds which fall within the description provided herein. The oil may comprise a single type of oil or a mixture of one or more oils. The source of the oil is an industrial process or activity, which includes oil which is introduced into a solution by oil-covered or oil-containing products which are subjected to the process or involved in the activity, and oil which is introduced into a solution as a part of the process or activity, such as during metal production and manufacture. Typically, the oil is a hydrocarbon; typically, oils comprise hydraulic oils, surface finishing oils, quench oils, way oils, cutting, grinding and hobbing oils, and oils derived from food sources, such as animals and plants. The contamination of the an aqueous solution by an oil or oil-like contaminant results in an oil-solution mixture.

Due to the lower specific gravity of the oil contaminant, the oil rises to the surface of the oil-solution mixture. Thus, the upper surface of the mixture is enriched in the oil contaminant.

The oil-solution mixture resulting from industrial processes is typically contained at the point of the industrial process or activity giving rise to the contamination of the solution; containers include but are not limited to vessels and tanks; preferably, the mixture is contained within a tank. The tanks may contain varying volumes of the mixture, with varying surface areas. Typically, the volumes of the tanks range from about one to several hundred gallons, and the surface area may range from about one hundred square inches to several square yards. The tank may contain within it obstacles at or near the surface of the mixture. By "obstacle" it is meant an item within the tank which might disrupt the movement of a skimmer across the surface of the tank. Such items include but are not limited to mechanical apparatus supporting the tank's purpose, including sprann and immersion hardware, pipes, and other machinery parts.

Many different types of oil skimmers have been devised, which can be divided into six categories. One category is a belt skimmer, which use an endless belt of stainless steel, elastomer or poly medium, which is lowered into a tank or vessel to be skimmed. The belt passes through resilient wiper blades where the oil is removed from both sides of the medium. Another is a disk skimmer, which use a very small motor to rotate a disk shaped medium through the liquid. Oil is removed and discharged into a collection container in a manner similar to a belt skimmer. Yet another is a drum or barrel skimmer, which is similar to a disk skimmer, but which uses a rotating drum or barrel shaped medium. Yet another is a mop skimmer, which use an endless medium shaped like a rope and having mop-like tendrils that pick up the oil. As the medium leaves the liquid and enters the drive unit, it is pressed and wrung out with pinch rollers. Yet another is a tube skimmer, which uses a floating plastic hose that snakes out over the surface of the liquid and is then drawn back through the drive unit where the oil is removed. Yet another is a floating suction skimmer, which comes in several forms but which all have a floating intake. All of these skimmers possess an inlet and an outlet for the skimmed oil, by means of which the oil is taken into the skimmer and then passed out of it.

The skimmer of the present invention is a surface skimmer. It is also portable, and preferably light weight. By "portable" it is meant that the skimmer can be maneuvered by a single individual, and easily and quickly placed onto and removed from the surface of the solution to be surface-skimmed. By "light weight" it is meant that the skimmer itself weighs only about 15 pounds or less; preferably, the skimmer weighs about 10 pounds or less; most preferably, the skimmer weighs about 5 pounds or less. Any of the skimmers described above would be suitable for use in the invention, provided that the skimmer was used as a surface skimmer, and that it met the criteria of portability, light weight, and capable of being manually controlled from a remote location. Preferably, the skimmer is a floating surface skimmer. In one preferred embodiment the surface skimmer comprises an integral overflow weir leading to an evacuation chamber for removal of the skimmed fluids. The skimmer may further be buoyantly supported on the surface by flotation assemblies which are integral or attached to the skimmer.

The skimmer is also capable of being manually controlled from a remote location. By "manual control" it is meant that the skimmer can be moved across the surface by and under the control of an operator; by "a remote location" it is meant that the operator is located near the oil-solution mixture and has access to the surface of the mixture, but is not in the mixture. Preferably, the mixture is located in a tank, and more preferably, the tank is located in an industrial environment, such as at a manufacturing facility. In this embodiment, the operator may be located on a deck or catwalk surrounding the tank, either completely outside the tank or partially or completely overhanging the tank, or the operator may be located outside an outside wall of the tank. Manual control may be achieved by any of several means. One example of such means is the conduit attached to the skimmer outlet and by which oil skimmed and removed from the surface of the solution by the skimmer is transported to a collection means. Another example is a rope attached to the skimmer, which can pull the skimmer across the surface. Another example is a rod attached to the skimmer, which can maneuver the skimmer across the surface. The operator utilizes the manual control means to pull or push and to steer or direct or maneuver the skimmer across the surface of the solution in the tank. Preferably, the means allow the operator to guide the skimmer across the surface of the solution and around any obstacles at or near the surface, and to guide the skimmer along the outer edges of the surface. The maneuvering of the skimmer may be referred to as a "sweeping" or "vacuuming" of the oil contaminant from the surface of the solution. Preferably, the manual control means is a conduit which is sufficiently stiff to allow an operator to guide the skimmer as described.

The present invention also comprises a conduit, such that the oil removed by the skimmer is connected to a collection means by a conduit. The conduit is connected at one end to the skimmer outlet and serves as the means by which the skimmed oil is removed from the skimmer and transported away from the surface. Preferably, the conduit is connected to the skimmer such that an airtight seal is formed. The conduit is generally tubing or piping of sufficient diameter to remove the oil at the same rate by which it is collected by the skimmer. Preferably, the material of the conduit is able to withstand exposure to the oil. Preferably, the conduit is sufficiently flexible and extendable to accommodate guiding the skimmer across the surface of the solution. The other end of the conduit discharges the oil into a collection means; preferably, the collection means is a vessel; most preferably, the collection means is a separator. Preferably, the conduit is connected at its other end to the collection means; more preferably, the conduit is connected to the collection means such that an airtight seal is formed.

The removed oil contaminant may be treated in different ways. In one aspect, the removed oil contaminant accumulates in a collection vessel and is then removed; such collected oil contaminant may be discarded or it may be further treated elsewhere. In another aspect, the removed oil contaminant is further purified by a separator which is part of the system for removing and treating surface oil contaminants.

Many different types of separators are known, and include from one to several of the following: filtration separation, gravity separation, including vertical and horizontal separators, and coalescing separators, which include tightly packed beds of plates, helical coalescers, and gas bubbles. A separator of the method of the present invention is mobile, and preferably light weight. By "mobile" it is meant that the separator can be maneuvered by a single individual, and easily and quickly moved from one mixture to another. Mobility can be achieved by carrying the separator, or more preferably by moving the separator by rolling it on wheels. The wheels may be attached to the separator or they may be located on a rolling means on which the separator is placed. Such rolling means include but is not limited to carts, trolleys, dollies, and carriers. By "light weight" it is meant that the separator when empty weighs only about 100 pounds or less; preferably, the separator weighs about 50 pounds or less; most preferably, the separator weighs about 25 pounds or less. Any of the separators currently known would be suitable for use in the invention, provided that the separator met the criteria of mobility and light weight. Preferably, the separator is a simple vertical separator. The separator further separates the aqueous solution from the removed oil contaminant; the separated solution may be returned to the solution, as for example in the tank from which the oil contaminant was removed, or the separated solution may be discarded. The separated oil contaminate is discharged from the separator for subsequent handling.

The present invention further comprises means for creating negative pressure in the skimmer, such that the oil contaminant at the surface of the solution is removed by being sucked into the system by the negative pressure at the skimmer. The negative pressure also serves to transport the oil contaminant through the conduit to the collection means. In one embodiment, negative pressure can be created by compressed air, as for example by running the air through a venturi. In another embodiment, the negative pressure is created by a vacuum or a blower; the means to create a negative pressure is referred to as a negative pressure source. Negative pressure sources include but are not limited to impeller fans, which move air from the skimmer through the conduit and to the separator, where it is discharged. The negative pressure source may be located anywhere between the skimmer and the collection means; preferably, it is located near the collection means; most preferably, it is mounted to either the collection means, or to the rolling means on which the separator is placed. The negative pressure source is connected by means such as threaded connectors to the collection means. The conduit, also being connected to the collection means by is thereby connected directly to the negative pressure source. The negative pressure source may be attached either permanently or removably; preferably, the negative pressure source is mounted removably; for easier service and replacement. Means for attaching the negative pressure source include but are not limited to shelving and brackets, which may be attached to the collecting means or to the rolling means by welding or bolts or clamps.

The system provided by the present invention comprises a surface skimmer, a collection means which is preferably a separator, a conduit connecting the skimmer to the collection means, and means for creating negative pressure in the skimmer, where the skimmer is lightweight and portable and capable of manual control from a remote location, and where the collection means is lightweight and mobile; the system finds particular application in removing a layer or batch of an oil contaminant from the surface of a solution where the solution is contaminated by the oil as a result of an industrial process or activity. The skimmer is manually controlled to remove a layer or batch of oil by the skimmer.

DESCRIPTION OF PARTICULAR EMBODIMENTS

The present invention is directed to a method for removing a layer or a batch of an oil contaminant from the surface of solution, and to a system for carrying out the methods of the invention, where the system is small, easily used, and mobile. The small size and mobility of the system means that it is easily deployed, for example by a single operator, at the site of contamination, for example a tank containing an oil contaminated solution in an industrial setting, and that it can be easily moved, for example by a single operator, and from tank to tank in an industrial setting. The small size and mobility of the system, in which an operator manually operates the skimmer, allows for increased accuracy in removing an oil contaminant from small surfaces of solution; it also allows for removal of oil contaminants at locations in which access is limited by space or time constraints.

The system of the present invention for carrying out the methods of the invention comprises a surface skimmer, a collection means, a conduit connecting the skimmer to the collection means, and means for creating negative pressure in the skimmer, where the skimmer is lightweight and portable, and capable of manual control from a remote location, and where the system is lightweight and mobile. The size of the system is selected to match the size of the surface areas to be skimmed. For example, very small areas are skimmed by a small skimmer with a very small inlet; such small skimmers are most preferably connected to a conduit with a narrow diameter. The conduit may be connected to a collection means which can accommodate oil contaminants collected from only a small surface area, or which is sufficiently large to accommodate collected oil contaminants from more than one tank.

In its simplest form, the skimmer comprises a hollow tube 1 with two openings in fluid communication through the tube, as illustrated in FIGS. 1A and 1B. One opening contacts the surface of the solution, and is the skimmer inlet 3, and the other end can be connected to a conduit, and is the skimmer outlet 5. The tube 1 need not be circular; a variety of circumferences, from square to rectangular to circular are anticipated. The size of the tube 1 is variable, with smaller tubes suitable for smaller tanks; preferably, the tube 1 is from about one to several inches in diameter, and from about two to about 24 inches in length. The skimmer inlet 3 may comprise an open end of the tube 1; preferably, it is an opening cut into the tube 1 along the length of the tube 1, but close to one end, where the end is closed. The closed end 7 may be any configuration, but is preferably butt ended or wedge shaped or conical shaped. The outer wall of the tube 1 from the closed end 7 of the tube 1 to the edge of the skimmer inlet 3 closest to the closed end 7 then acts as a weir 9. The skimmer inlet 3 may be any shape, but preferably the edge closest to the closed end is straight and perpendicular to the long axis of the tube 1. The size of the skimmer inlet 3 is also variable, but preferably less than about half of the circumference of the tube 1, and in the range of about one to several inches in length along the long axis of the tube 1. Preferably, the skimmer outlet 5 is located at the opposite end from the skimmer inlet 3.

Preferably, the skimmer outlet is configured to connect tightly to one end of a conduit (the "conduit inlet"); such a configuration ranges from a close fit, such that either the skimmer outlet fits over the conduit inlet, or the conduit inlet over the skimmer outlet, to a threaded connection between the skimmer outlet and the conduit inlet. When the configuration is a tight fit, the skimmer and conduit may be more securely connected by additional means, such as a latch. An example of a latch is given for a skimmer outlet which fits into a conduit inlet; the latch comprises an elongate extension of the conduit inlet which is configured to fit over a raised knob on the outer wall of the skimmer outlet; a typical configuration is an opening in the extension which fits over the knob.

In one embodiment, the system comprises skimmers of differing sizes for use in surface areas of differing sizes and configurations. The skimmers are configured to be easily removed from the conduit, as for example by the skimmer outlet whose outer diameter matches the diameter of the conduit inlet for a close fit, but where the skimmer outlet diameter is either smaller than, the same size than, or larger than the outer diameter of the skimmer at the inlet end. Alternatively, different skimmers are configured to receive connectors with appropriate diameters at either end such that a skimmer with a smaller outlet diameter can be connected to a larger diameter conduit inlet, and so one. The skimmers may be stored on the collection vessel or rolling means, as for example suspended from hooks or placed over holders or snapped onto carrying racks.

In use, the inlet of the skimmer is positioned just upon the surface of the solution, then moved across the surface such that the entire surface, or the desired area, is exposed to the skimmer, to remove the oil layer or batch. For small surface areas, the skimmer may be hand held by an operator. For larger surface areas, the conduit may be hand held by the operator. Alternatively, a handle piece or rod may be attached to the skimmer for ease of manipulation and for more remote control.

In some embodiments, the position of the skimmer inlet relative to the surface of the solution is controlled by the operator, who exerts pressure upon the skimmer sufficient to submerge the top of the weir 9 to the desired distance below the surface of the solution. Thus, for the skimmer illustrated in FIGS. 1A and 1B, the closed end 7 of the tube 1 is placed into the solution until the top of the weir 9 is the desired distance below the solution surface. In other embodiments, the position of the skimmer relative to the surface of the solution may be additionally controlled by the presence of at least one flotation assembly. Such flotation assemblies are well known, and any appropriate configuration is contemplated. For example, the flotation assembly may comprise at least one float integral to the skimmer; in one embodiment, the floats are configured as one or more closed chambers surrounding the inlet, with a flat surface of the chambers which can contact the surface of the solution. The chambers may be filled with air or other buoyant materials, such as foam or compressed foam. In other embodiments, the floatation assembly comprises at least one float external to and attached, either fixedly or removably, to the skimmer; either type of float may be adjustable, to vary the distance between the skimmer inlet and the floatation assembly.

Figure 2A:
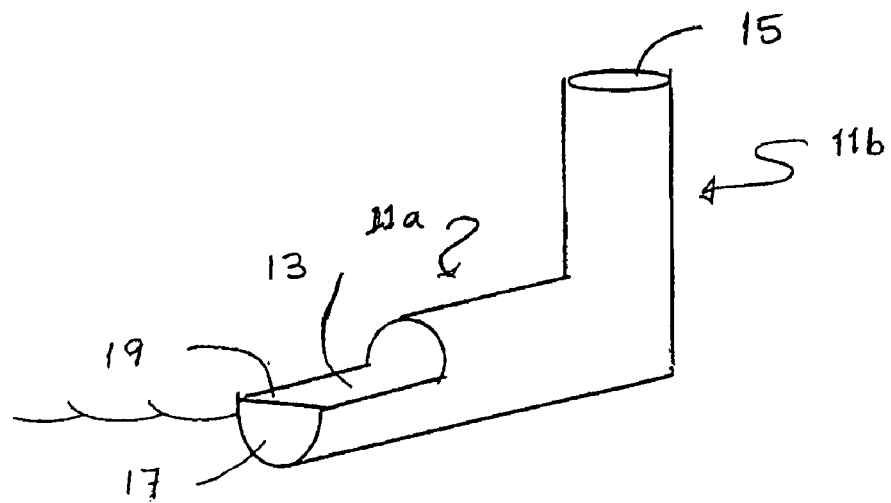
FIG. 2A shows a perspective view of the skimmer without a flotation assembly.
Figure 2B:
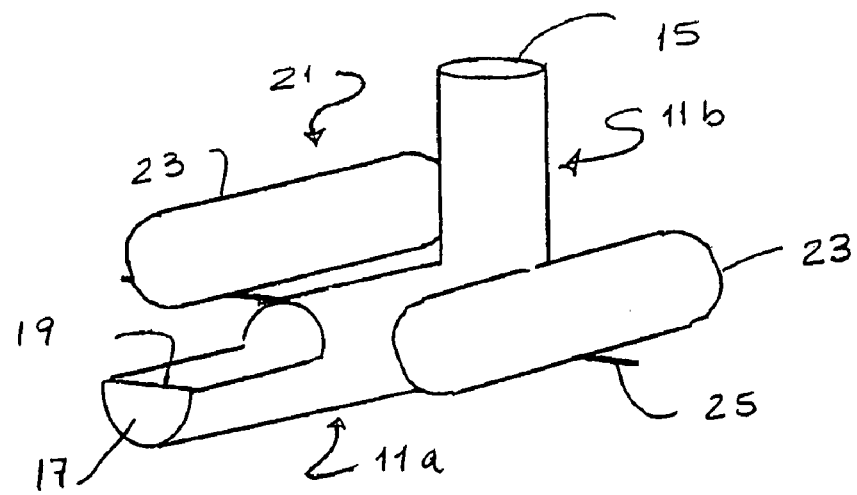
FIG. 2B shows a perspective view of the skimmer with a flotation assembly.

In yet other embodiments, the skimmer is an angled skimmer, as shown in FIGS. 2A and 2B. Preferred embodiments include both snub nose and other versions, such as wedge-shaped. In these embodiments, the skimmer comprises a hollow tube 11 which is angled. The tube 11 need not be circular; a variety of circumferences, from square to rectangular to circular are anticipated. In these embodiments, the end near the skimmer inlet 13 is only partially closed. The open portion of the end comprises part of the skimmer inlet 13, and the skimmer inlet 13 extends for some distance along the tube 11a from the partially closed end 17. Preferably, the end of the tube 11a is about half closed, and preferably the edge of the partially closed end 17 is substantially straight and perpendicular to the long axis of the tube 11a. Other configurations are contemplated; in one example, the partially closed end 17 of the skimmer is wedge shaped, such that the partially closed end 17 angles out to form a wedge, similar to the prow of a ship. The partially closed end 17 is closest to the surface of the solution, and the tube 11 is placed substantially horizontally upon the solution surface; thus, the partially closed end 17 acts as a weir 19 for the skimmer. The tube 11a is bent at some distance beyond the skimmer inlet 13, such that the remaining length of the tube 11b is at an angle from the plane of the solution surface; preferably, the angle is substantially perpendicular such that the remaining portion of the tube 11b is vertical with respect to the solution surface. The end of the vertical portion of the tube 11b is open, and comprises the skimmer outlet 15.

In alternative embodiments, the skimmer further comprises flotation assemblies. In the embodiment shown are illustrated in FIG. 2B, the flotation assembly 21 comprises external floats 23 attached to the skimmer tube 11a by means of brackets 25. Preferably, the floats 23 are elongated, and oriented parallel to the long axis of the skimmer tube 11a and parallel to the surface of the solution, to stabilize the skimmer as well as to control the height of the weir 19 relative to the solution surface. Floats and bracket assemblies are well known in the art. Other flotation configurations are also contemplated.

An example of a more complex surface suction skimmer, which is potentially suitable for the system of the present invention, under limited situations, is described in U.S. Pat. No. 5,948,266. However, this particular skimmer suffers several disadvantages; one in particular is the presence of ballasts, which must be filled with water to add ballast and stability to the skimmer, and which must be dumped after use. Filling and emptying the ballasts disrupts the surface of the oil-water mixture, making it more difficult to collect the surface layer of oil contaminant, and possibly emulsifying the surface oil contaminant, as well as exposing the operator, and the immediate environment, to unacceptably high amounts of potentially hazardous water solutions. The skimmer disclosed in the patent is better suited to its intended uses in marinas, where the surface areas to be skimmed are much larger, and the use of water in the ballasts less potentially disrupting and dangerous, than in the situation of solution contaminated by oil as a result of an industrial process.

In some embodiments, the skimmer has an elongated handle piece or pole secured to it in such a manner as to allow guidance of the skimmer on the surface of the solution; in preferred embodiments, the handle or pole is secured to the skimmer to allow swiveling relative to the skimmer body and steering manipulation of the skimmer body by twisting the pole. In one embodiment, the handle is a multi-section telescoping pole, to allow skimming up to several meters away from the operator. In yet other embodiments the swivel connection between the manipulating pole and the skimmer body is a two-axis gimbal, although other forms of connection are contemplated. In other embodiments, the skimmer is simply connected to the conduit, which serves both as a skim withdrawal conduit and as a means of manipulating the skimmer on the liquid body. In use, the skimmer is manipulated and steered by means of the handle, the pole, or the conduit. This allows an operator to be more distant from the surface of the solution, and to skim a larger surface of the solution.

The system further comprises a conduit comprising an inlet and an outlet in fluid communication, where the conduit is connected at its inlet to the skimmer outlet, and at its outlet to the oil collection means. Thus, the conduit serves as the means to transfer the skimmed oil contaminant from the solution surface to the collection means. Many types of conduit are appropriate and contemplated. In some embodiments, the conduit is a rigid hollow tube or pipe; in other embodiments, the conduit is flexible hollow tubing, piping, or hose; in other embodiments, the conduit is flexible, extendible tubing, piping, or hose; in yet other embodiments, the conduit is a combination of at least one rigid hollow tube or pipe (referred to as a "wand") and at least one flexible, extendible hose. This combination is connected, preferably so as to form an airtight seal. In preferred embodiments, the wand comprises more than one section, such that different lengths are achieved by joining together a different number of sections; preferably, the wand comprises from one to three sections. The conduit combination of hose and wand is most useful when the conduit itself is used as the means by which the skimmer is manipulated on the surface of the solution.

The system further comprises a collecting means, which is connected to the conduit at the conduit outlet. In one aspect, the collection means is a vessel, into which the removed layer or batch of oil is discharged from the outlet of the conduit. Many different types of vessels are contemplated; the collected oil contaminant in the vessel may be discharged by disconnecting the conduit and simply pouring out the oil contaminant, or the vessel may be equipped with at least one valve such that the collected oil contaminant may be discharged from the vessel by the valve. In another aspect, the collection means is a separator. Preferably, the separator is a vertical separator. In some embodiments, the separator comprises a cylindrical vessel; preferably, the bottom of the vessel is domed or conical, and fitted at the lowermost point with an outlet valve. The conduit is removably connected to the separator by connection means which are well known, and include but are not limited to a removable band/ring clamp and a fully piped and threaded joint. In some embodiments, the conduit is connected to the separator in airtight fit. In use, the separator is filled with an oil contaminant removed by the skimmer and transported to the separator by the conduit. The oil contaminant may be removed from one or more than one tank; the tanks may contain the same or different solutions and oil contaminants. The removed oil contaminant is allowed to sit for a period of time sufficient to result in separation of the aqueous solution from the oil contaminant; this period varies, depending upon the characteristics and relative amounts of the oil contaminant and the solution, but is typically from one to several hours. The separated solution is then discharged from the bottom of the separator by opening the valve, and the oil is retained within the separator by closing the valve. The amount of solution to be discharged can be judged visually, and the valve closed when the amount of the oil contaminant in the discharging solution surpasses a threshold level. The oil contaminant remaining in the separator can then be discharged by opening the valve. Alternatively, the separator can be filled again by additional batches of oil contaminants removed from the surface of additional tanks, and the solution again separated from the oil contaminant as described. The frequency of oil discharge will depend upon the characteristics and relative amounts of the oil contaminant and the water solution.

In an alternative embodiment, the separator further comprises a sight glass exterior to the tank. In one embodiment, a sight glass is positioned within a discharge line that evacuates the separator from the bottom. The site glass is connected to the line by well known means, which include but are not limited to threaded connections and flanges. The sight glass allows an operator to visually determine when the water has sufficiently separated from the oil contaminant to allow discharge of the water from the bottom of the separator.

In yet other embodiments, the separator is a vertical separator further comprising coalescers; such coalescers are well known. In a preferred embodiment, the coalescer is a helical coalescer as is described in U.S. patent application Ser. No. 09/531,623, which is hereby incorporated by reference in its entirety.

The present invention further comprises means for creating negative pressure in the skimmer. Such means for creating negative pressure are well known. In one aspect, negative pressure can be created by plant air, as for example by running the air through a venturi. In other aspects, other gases, such as steam, or liquids, such as water, can be run through a venture. In yet other aspects, the negative pressure is created by a vacuum or a blower; the means to create a negative pressure is referred to as a negative pressure source. Such a source includes but is not limited to an impeller fan. The negative pressure source may be located anywhere between the skimmer and the collection means; preferably, it is located near the collection means; most preferably, it is mounted to either the collection means, or to the rolling means on which the separator is placed. The negative pressure source is connected by means such as threaded connectors to the collection means; in one embodiment, the connection is airtight. The conduit, also being connected to the collection means, is thereby connected directly to the negative pressure source; in one embodiment, such connection is airtight. The negative pressure source may be attached either permanently or removably; preferably, the negative pressure source is mounted removably, for easier service and replacement. Means for attaching the negative pressure source include but are not limited to shelving and brackets, which may be attached to the collecting means or rolling means by welding or bolts or clamps.

Skimmers, conduits, and separators of the present system as described herein may be constructed of any number of industrially available materials, including but not limited to plastics, fiberglass, aluminum, mild steel, and stainless steel. Each component of the system may be manufactured of a different material; any particular component may be manufactured from more than one material. Preferably, the components of the system are constructed of materials suitable to meet temperature and corrosion requirements of the installation. The skimmer and the collection means can be manufactured of any appropriate material sufficient to handle the temperature in the source tank. For example, when the system is used to skim washing solutions which are used to wash machine parts or heat-treated parts, and the washing solution is contaminated with manufacturing oils and heat treating quench oils, the separator is preferably fabricated of stainless steel. The conduit must be manufactured of appropriate materials so as to handle high temperatures and also be vacuum rated so that it does not collapse under the negative pressure to which it is subjected.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the relevant fields are intended to be within the scope of the following claims.

We claim:

1. A method for removing a layer of an oil contaminant from the surface of an aqueous solution, comprising:
   a) providing
      i) a solution contaminated by surface finishing oil, wherein said solution has a surface, and
      ii) a surface skimmer comprising a conduit connected to a tube having an inlet end having a top portion, said inlet end having an inlet opening therein, wherein said inlet opening is on said top portion of said inlet end of said tube so that said inlet end is partially closed; and
   b) positioning said tube on said surface of said solution so that said inlet end is submerged in said solution and said inlet opening is approximately positioned at the surface of said solution; and
   c) applying negative pressure to said tube under conditions such that said surface finishing oil is removed from said surface of said solution into said tube then into said conduit.

2. The method of claim 1, wherein said conduit is fluidically connected to a collection vessel and surface finishing oil removed from said solution collects in said collection unit.

3. The method of claim 1, wherein said tube is manually moved across said surface of said solution.

4. The method of claim 1, wherein said surface finishing oil in said collection vessel is further separated.

5. The method of claim 1, wherein said tube is substantially circular.

6. The method of claim 1, wherein inlet opening is substantially rectangular.

* * * * *